(12) United States Patent
Sepe, Jr.

(10) Patent No.: US 12,275,315 B2
(45) Date of Patent: Apr. 15, 2025

(54) HYBRID POWER MANAGEMENT SYSTEM AND METHOD FOR DELIVERING POWER IN A TRANSPORT VEHICLE

(71) Applicant: ELECTRO STANDARDS LABORATORIES, Cranston, RI (US)

(72) Inventor: Raymond B Sepe, Jr., Medfield, MA (US)

(73) Assignee: Electro Standards Laboratories, Cranston, RI (US)

( * ) Notice: Subject to any disclaimer, the term of this patent is extended or adjusted under 35 U.S.C. 154(b) by 0 days.

(21) Appl. No.: 18/629,414

(22) Filed: Apr. 8, 2024

(65) Prior Publication Data

US 2024/0253479 A1    Aug. 1, 2024

Related U.S. Application Data

(63) Continuation of application No. 17/381,115, filed on Jul. 20, 2021, now Pat. No. 11,951,849.

(51) Int. Cl.
| | |
|---|---|
| *B60L 53/12* | (2019.01) |
| *B60H 1/32* | (2006.01) |
| *B60L 53/50* | (2019.01) |
| *B60L 55/00* | (2019.01) |

(52) U.S. Cl.
CPC ............ *B60L 53/12* (2019.02); *B60H 1/3204* (2013.01); *B60L 53/50* (2019.02); *B60L 55/00* (2019.02); *B60L 2210/10* (2013.01)

(58) Field of Classification Search
CPC .......... B60L 53/12; B60L 55/00; B60L 53/50; B60L 2210/10; B60H 1/3204

USPC ........................................................ 307/10.1
See application file for complete search history.

(56) References Cited

U.S. PATENT DOCUMENTS

| | | | |
|---|---|---|---|
| 8,295,950 | B1 | 10/2012 | Wordsworth et al. |
| 9,778,653 | B1 | 10/2017 | McClintock et al. |
| 10,843,819 | B2 | 11/2020 | Wheatley et al. |
| 2013/0000342 | A1 | 1/2013 | Blasko et al. |
| 2015/0135863 | A1* | 5/2015 | Dalum ................ B60K 6/00 180/65.21 |

(Continued)

OTHER PUBLICATIONS

Tangermann, "Toyota Patents Autonomous Battery Drone That Recharges Your Car," The_Byte, Nov. 16, 2020, http://futurism.com/the-byte/toyota-patents-autonomous-battery-drone-recharges-car, pp. 1-6.

(Continued)

*Primary Examiner* — Hal Kaplan
*Assistant Examiner* — Swarna N Chowdhuri
(74) *Attorney, Agent, or Firm* — IP AUTHORITY, LLC; Ramraj Soundararajan (57) ABSTRACT

A system to deliver power to a load in a transport vehicle has: (a) a battery; (b) a super capacitor bank; (c) a bidirectional DC/DC converter configured to transfer power to/from the super capacitors in order to absorb/supply power from/to the load, and configured to transfer power between the super capacitors and the battery and/or the load in order to charge the super capacitor from the battery or load or charge the battery/load from the super capacitors in a controlled way (d) a hybrid controller configured to identify when pulsed power is required to/from the load, and based on a charging pulse profile, supplying a plurality positive and/or negative current pulses to the battery.

20 Claims, 11 Drawing Sheets

(56) References Cited

U.S. PATENT DOCUMENTS

| | | |
|---|---|---|
| 2015/0246593 A1 | 9/2015 | Larson et al. |
| 2016/0001662 A1* | 1/2016 | Miller .................... H02J 50/40 |
| | | 307/104 |
| 2020/0017210 A1* | 1/2020 | Neubecker ............. B64U 70/92 |
| 2020/0233410 A1* | 7/2020 | Burns ..................... B60L 50/66 |
| 2021/0313121 A1* | 10/2021 | Macaluso ............... B60L 50/40 |

OTHER PUBLICATIONS

Smith et al., "Development and Analysis of a Lithium Carbon Monofluoride Battery-Lithium Ion Capacitor Hybrid System for High Pulse-Power Applications," Journal of Power Sources, vol. 327, 2016, pp. 495-506.

Miller et al., "Demonstrating Dynamic Wireless Charging of an Electric Vehicle, The benefit of electrochemical capacitor smoothing," IEEE Power Electronics Magazine, Mar. 11, 2014, pp. 12-24.

* cited by examiner

HYBRID POWER MANAGEMENT SYSTEM AND METHOD FOR DELIVERING POWER IN A TRANSPORT VEHICLE

CROSS-REFERENCE TO RELATED APPLICATIONS

This application is a continuation of co-pending application Ser. No. 17/381,115, filed Jul. 20, 2021.

FIELD OF INVENTION

The present invention relates generally to the field of power delivery. More specifically, the present invention is related to hybrid power management system and method for delivering power in a transport vehicle.

DISCUSSION OF RELATED ART

Electrification of vehicles is becoming pervasive as society moves to reduce its carbon footprint. In the transport refrigeration industry, perishable goods are moved by truck, rail, vessel, etc. with diesel or gas powered refrigeration or environmental control systems. These systems create carbon emissions and for the vehicle operator, such as truck drivers, they are the source of ever-present noise both day and night as goods are transported over long distances to delivery sites or distribution centers.

Figure 1:
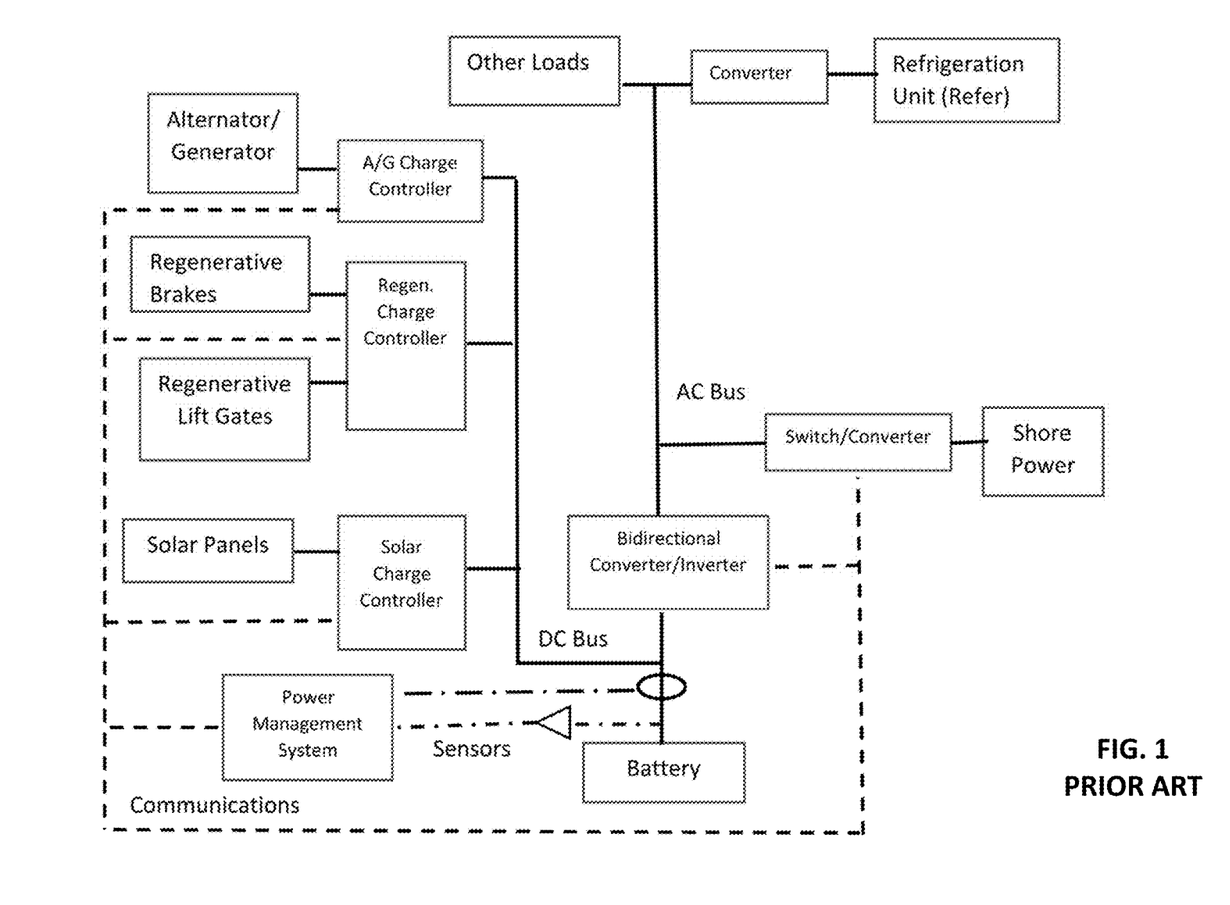
FIG. 1 illustrates a prior art power management system.

Prior art U.S. Pat. No. 8,295,950 B1 (Wordsworth et al.) and U.S. 20150246593 A1 (Larson et al.) discuss the elimination of the diesel or gas engines and fuel tanks on refrigeration trailers and replaces these with battery packs that can be charged from grid shore power, attached solar panels, engine alternators, or capture regenerated energy during vehicular braking, for example. Often the bulk charging is done via a shore power connection over a longer period of time while solar panels and other auxiliary energy sources often serve the roll of a supplemental battery charging source that extends the operating time and tops off the battery state of charge. FIG. 1 depicts an architecture of such a representative prior art system. Prior art U.S. 20130000342 A1 (Blasko et al.) describes a transport refrigeration system with an engine driven generator and solar power with a controller that selects which two sources to use in operating compressors and fans. While these solutions do eliminate the need for a dedicated fossil fuel source, none of them address the battery's degraded performance that results from opening and closing compartment doors which causes the refrigeration compressor to cycle on and off drawing large power pulses from the battery, regenerative braking which generates large power pulses into the battery, wide ranges of ambient temperature which lowers the battery's efficiency as the vehicle travels to different destinations, and repeated discharge/recharge cycling as the vehicle's battery needs recharging. These conditions are common in transport vehicles and they serve to stress and degrade the battery resulting in reduced energy capacity, reduced lifetime, reduced endurance, and can severely limit the practical operational range of the system. These deficiencies dictate the need for larger batteries but the added cost, size, and weight are prohibitive and can render the entire system unfeasible. The present invention addresses these shortcomings and expands the capabilities of the refrigerated transport system to include serving as a mobile bidirectional power station for unmanned autonomous drones without degrading the battery.

Embodiments of the present invention are an improvement over prior art systems and methods.

SUMMARY OF THE INVENTION

In one embodiment, the present invention provides a transport vehicle power system configured to deliver power to a load in a transport vehicle, the transport vehicle power system comprising: (a) a battery; (b) a super capacitor bank comprising a plurality of capacitors; (c) a bidirectional DC/DC converter: (i) the bidirectional DC/DC converter, in order to regulate a pulsed power applied to the battery, configured to either: (1) transfer power to the super capacitor bank in order to absorb power from the load; or (2) transfer power from the super capacitor bank in order to supply power to the load; and (ii) the bidirectional DC/DC converter configured to transfer power between the super capacitor bank and the battery and/or the load in order to charge the super capacitor bank from the battery or the load, or charge the battery/load from the super capacitor bank in a controlled manner using a hybrid controller in order to minimize battery stress and battery degradation; (d) the hybrid controller: (i) the hybrid controller, in order to minimize power transients on the battery, configured to identify: (1) when pulsed power is required to the load and instructing the bidirectional DC/DC converter to supply power to the load from the super capacitor bank, or (2) when pulsed power is required from the load and instructing the bidirectional DC/DC converter to absorb power from the load to the super capacitor bank; and (ii) the hybrid controller, in order to minimize battery stress and battery degradation, configured to identify when power needs to be transferred between the super capacitor bank and the battery/load to charge or discharge the battery/load and/or the super capacitor bank, and (e) computer storage storing at least one charging pulse profile for efficiently charging the battery; wherein the hybrid controller, based on the at least one charging pulse profile, supplying a plurality of positive current pulses, negative current pulses, and combinations thereof, to the battery, where the positive pulses draw current into the battery and the negative pulses draw current away from the battery and, wherein energy drawn out of the battery during application of negative pulses is captured by the hybrid controller rather than dissipated and is circulated back to the battery when needed during application of positive pulses.

In another embodiment, the present invention provides a transport vehicle power system configured to deliver power to a load in a transport vehicle, the transport vehicle power system comprising: (a) a battery; (b) a super capacitor bank comprising a plurality of capacitors; (c) a bidirectional DC/DC converter: (i) the bidirectional DC/DC converter, in order to regulate a pulsed power applied to the battery, configured to either: (1) transfer power to the super capacitor bank in order to absorb power from the load; or (2) transfer power from the super capacitor bank in order to supply power to the load; and (ii) the bidirectional DC/DC converter configured to transfer power between the super capacitor bank and the battery and/or the load in order to charge the super capacitor bank from the battery or the load, or charge the battery/load from the super capacitor bank in a controlled manner using a hybrid controller in order to minimize battery stress and battery degradation; (d) the hybrid controller: (i) the hybrid controller, in order to minimize power transients on the battery, configured to identify: (1) when pulsed power is required to the load and instructing the bidirectional DC/DC converter to supply power to the load from the super capacitor bank, or (2) when pulsed power is required from the load and instructing the bidirectional DC/DC converter to absorb power from the load to the super capacitor bank; and (ii) the hybrid controller, in order to minimize battery stress and battery degradation, configured to identify when power needs to be transferred between the super capacitor bank and the battery/load to charge or discharge the battery/load and/or the super capacitor bank; (e) an external bidirectional power transfer port, the hybrid controller instructing the bidirectional DC/DC converter to supply/absorb high power pulses to/from the external bidirectional power transfer port, the external bidirectional power transfer port configured to wirelessly charge/discharge an external device via wireless power transfer; and (f) computer storage storing at least one charging pulse profile for efficiently charging the battery; wherein the hybrid controller, based on the at least one charging pulse profile, supplying a plurality of positive current pulses, negative current pulses, and combinations thereof, to the battery, where the positive pulses draw current into the battery and the negative pulses draw current away from the battery and, wherein energy drawn out of the battery during application of negative pulses is captured by the hybrid controller rather than dissipated and is circulated back to the battery when needed during application of positive pulses.

BRIEF DESCRIPTION OF DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein.

The present invention extends the state of the art by developing a hybrid power management system for the transport vehicles that combines the standard power management function described in previous work with an advanced hybrid power management controller component that is capable of absorbing and supplying peaks of power thereby regulating and profiling the effective load on the battery to reduce battery stress and to provide rapid battery charging and discharging with little or no battery performance degradation. This enables less time between recharging, longer battery cycle life, and less sensitivity to ambient temperature variations. The hybrid power management unit also allows the system to efficiently supply or accept power pulses to/from external devices. This enables high power transfer and rapid charging/discharging that make it feasible to add a wireless autonomous drone power port. This allows a drone to land on or come in close proximity to the transport vehicle and wirelessly move power between the drone's battery and the vehicle's battery. Delivery drones can "hop" on or fly over the charging pad on the transport vehicle to recharge their batteries and continue their mission, or they can be used for in-motion recharging of the transport vehicle's battery.

While prior art U.S. Pat. No. 10,843,819 B2 (Wheatley et al.) discusses a network of renewable energy drone charging stations, it does not consider wireless power transfer, does not consider pulsed power stress on the batteries, does not consider mobile drone recharging, and does not include a hybrid power component. Prior art U.S. Pat. No. 9,778,653 B1 (McClintock et al.) and the article titled, "Toyota Patents Autonomous Battery Drone That Recharges Your Car," Nov. 16, 2020, discuss the use of flying drones and terrestrial autonomous vehicles, respectively, to deliver energy to a vehicle after docking, but do not consider bidirectional power transfer, do not consider wireless power transfer, do not consider in-motion wireless power transfer, do not consider pulsed power stress on the batteries, do not consider profiled high-speed charging, and do not include a hybrid power component that can reduce battery degradation. None of the prior art considers the use of refrigeration transport vehicles for the purpose of forming a roaming network of rapid drone recharging stations.

If the drone is also outfitted with a hybrid power management system, then the pulsed power stress of in-motion charging of the drone's battery is also removed and this results in longer lifetime and endurance for the drone's battery. Thus, the present invention provides significant enhancement to battery powered refrigeration transport's primary purpose to move perishable goods, and also supports drone delivery of goods by serving as an efficient pulsed power mobile refueling station that does not degrade batteries.

Figure 2A:
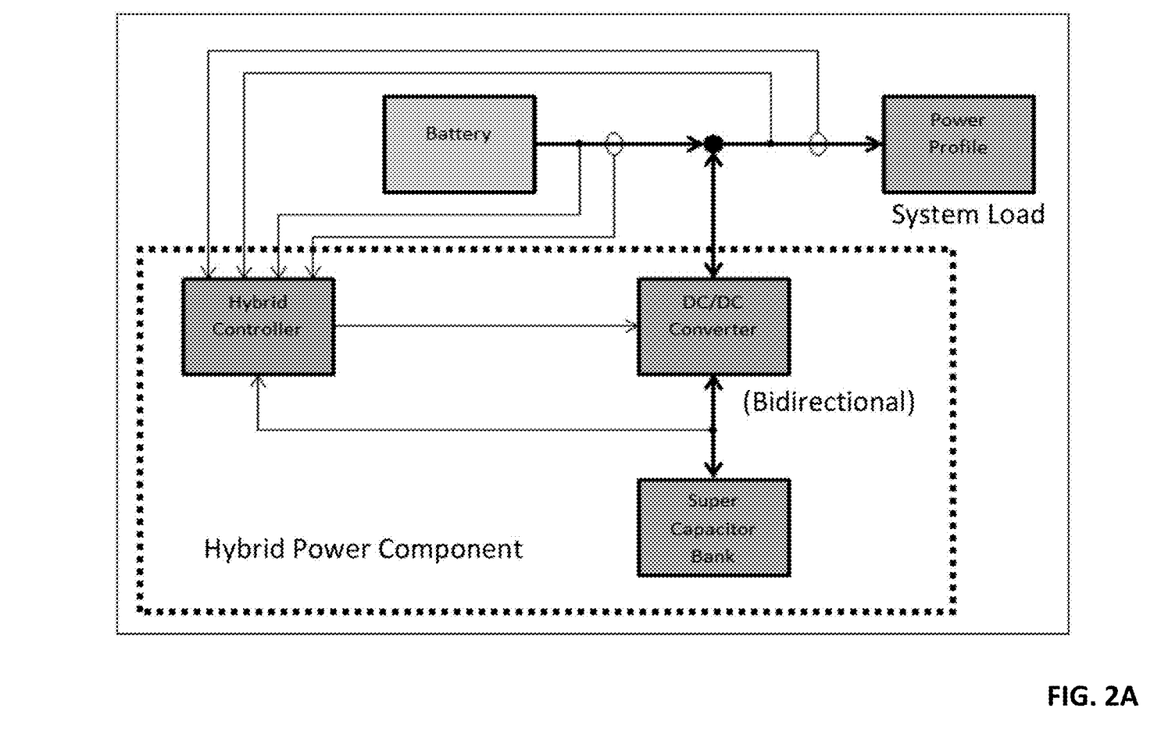
FIG. 2A illustrates the architecture of the hybrid power component.

The enhancement of the standard power management function with the hybrid power component enables the system to automatically monitor the state of health of the battery, and to optimize battery life and effective capacity by controlling the dynamic power demands on the battery. FIG. 2A shows the block diagram of the hybrid power component. It consists of a hybrid controller that measures the battery voltage and current and operates a bidirectional DC/DC converter that transfers power between a battery and a super capacitor bank, and vice versa. From a circuit perspective, typical super capacitors have capacitance values in the range of tens of Farads to thousands of Farads, low equivalent source resistances in the milliohm range, and very high cycle life in the thousands to millions of charge/discharge cycles. For example, commonly available super capacitors are manufactured by LICAP technologies and Maxwell technologies and listed as ultracapacitors, lithium-ion capacitors, and/or EDLC capacitors. A super capacitor bank is one or more series-parallel connections of super capacitor cells.

Figure 2B:
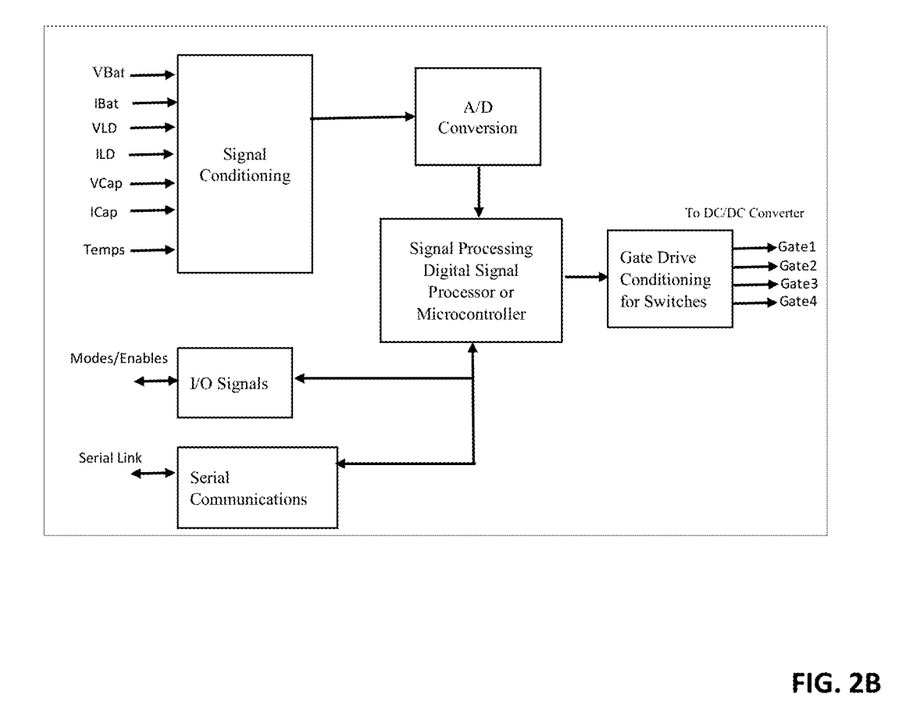
FIG. 2B depicts a block diagram of the hybrid controller.
Figure 2C:
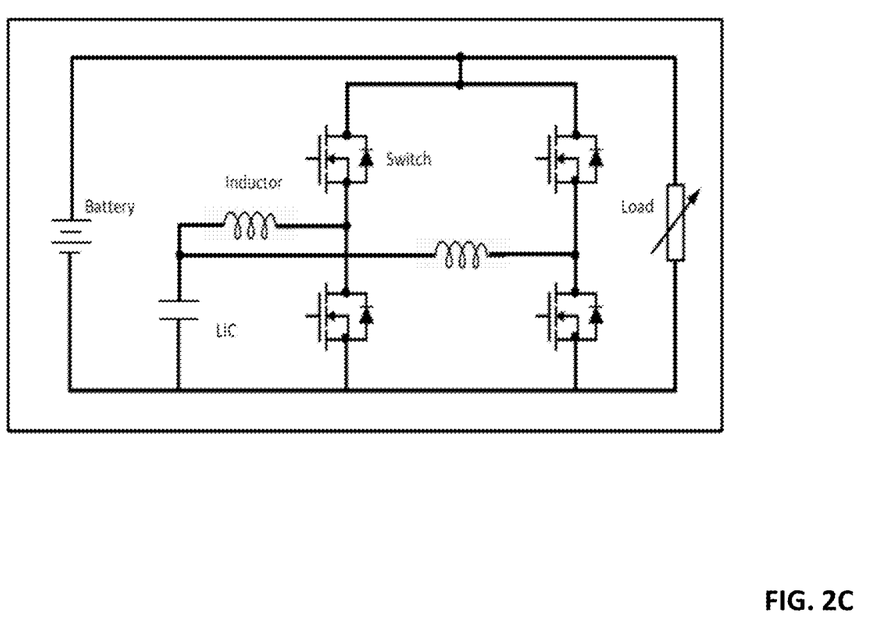
FIG. 2C depicts bidirectional DC/DC converter topology.

A detailed discussion of the architecture and operation of the hybrid controller, the DC/DC converter, and the super capacitors can be found in the article to Smith et al. titled "Development and Analysis of a Lithium Carbon Monofluoride Battery-Lithium-Ion Capacitor Hybrid System for High Pulse-Power Applications". FIG. 2B is a block diagram of the hybrid controller. The signal conditioning block contains circuitry that scales and filters the measurements before passing them on to the analog to digital (A/D) converter for digitization. Those numerical values are then passed to the Signal Processing block and used in the hybrid control algorithm to ultimately control operation of the DC/DC converter. Although a particular algorithm may not need to measure all of the quantities shown in FIG. 2B, this embodiment measures the battery voltage and current, the load voltage and current, the super capacitor voltage and current, and temperatures in the systems, VBat, IBat, VLD, ILD, VCap, ICap, and Temps, respectively. The input and output (I/O) signals are typically used to indicate the state of the controller and provide enable signals that can turn the controller on or off. The serial communications is typically a serial link such as a USB interface to PC that allows a user to send signals and monitor signals to/from the hybrid system. The gate drive signals are used to control the DC/DC converter in response to the hybrid control algorithm. These signals are typically pulse width modified digital signals that operate a power switches such as MOSFETs in the DC/DC converter. The switches are controlled in order to charge/discharge the super capacitors. Those versed in the state of the art will recognize these functional components of the hybrid controller as well as a typical bidirectional DC/DC converter topology, as shown in FIG. 2C.

The super capacitor bank has superior power capability than the battery and has a cycle life on the order of millions of cycles. A typical battery cycle life is on the order of hundreds or thousands of cycles or less. The super capacitor has very low source impedance and therefore can provide much higher currents and power than the battery.

The battery used, often lithium chemistry, provides much higher energy density than the capacitor and thus is suitable as the bulk energy storage component in the system. It should be noted that the super capacitor serves as the high power (relative to the battery) source but, in another embodiment, batteries optimized for high power (and therefore low energy) capability could be used instead of the capacitor. Batteries optimized for high power typically have lower source resistance, lower amp-hour rating, and higher discharge currents while batteries optimized for energy typically have high amp-hour rating, lower discharge current, and higher source resistance.

In the preferred embodiment, the super capacitor is used as the power element because of its extremely high cycle life. Similarly, lithium-ion battery chemistry is often preferred for bulk energy because of its very high energy density but other battery chemistries such as aluminum air, aluminum seawater, or other energy storage devices such as flywheels that can serve as a rechargeable high energy source could be used as well.

In repeated pulse power applications, the super capacitor handles the high-power pulses as the battery, having relative low power density, is not capable of safely supporting high power. When the hybrid controller detects that the load does not require the full discharge capability of the battery, the battery recharges the super capacitor in anticipation of another high-power pulse. The hybrid controller uses system measurements as feedback in controlling the DC/DC converter switches. The DC/DC Converter boosts the super capacitor voltage to the level of the load when supporting high power pulses, and steps the battery voltage down to the super capacitor voltage when recharging the super capacitor. The super capacitor energy requirements are dictated by the high-power level of the load and by the duration of the high-power pulses needed from or supplied by the battery. The battery power requirements are dictated by the low power level of the load plus the power required to recharge the super capacitor during intervals of low energy demand. The number of battery cells and super capacitors used is application dependent and is determined as a balance between the system's power and energy requirements, but does not change the applicability of the hybrid power management system.

Figure 3:
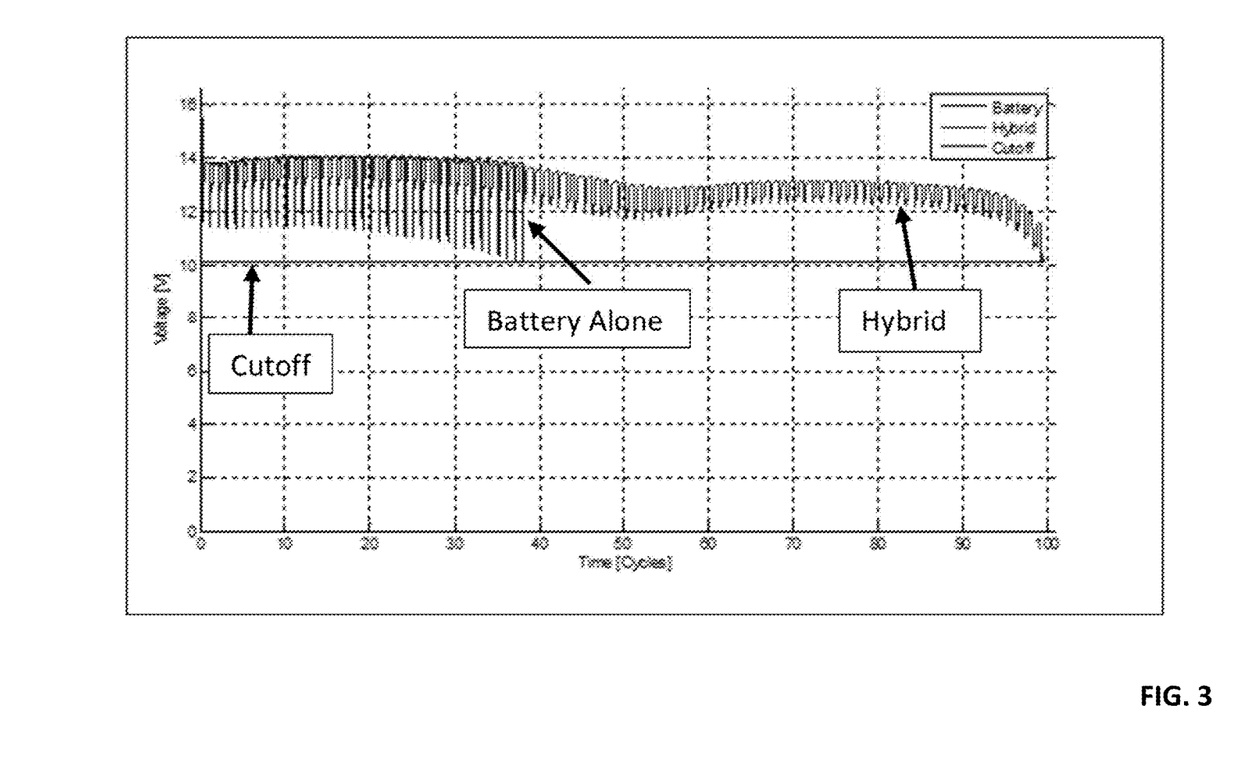
FIG. 3 depicts extended capacity of battery when used with hybrid under pulsed load conditions.

The experimental data in FIG. 3 shows the significant improvement in battery effective capacity that can result when using the hybrid controller rather than the battery alone when power peaks are present in the system. The plot shows a nominal 12V battery pack with a pulses power load applied to it. During peak power the battery voltage dips down and then recovers when the peak load is removed. As the 38th peak power pulse is applied, the battery voltage dips below the cutoff of 10V and the battery is considered to be discharged. When the same load demands are placed on the hybrid system that supplements the battery with the super capacitor, the battery can operate for 100 power cycles. This is more than a 2.6× increase in battery life. In a transport application, the battery would last significantly longer before needing to be recharged.

Figure 4:
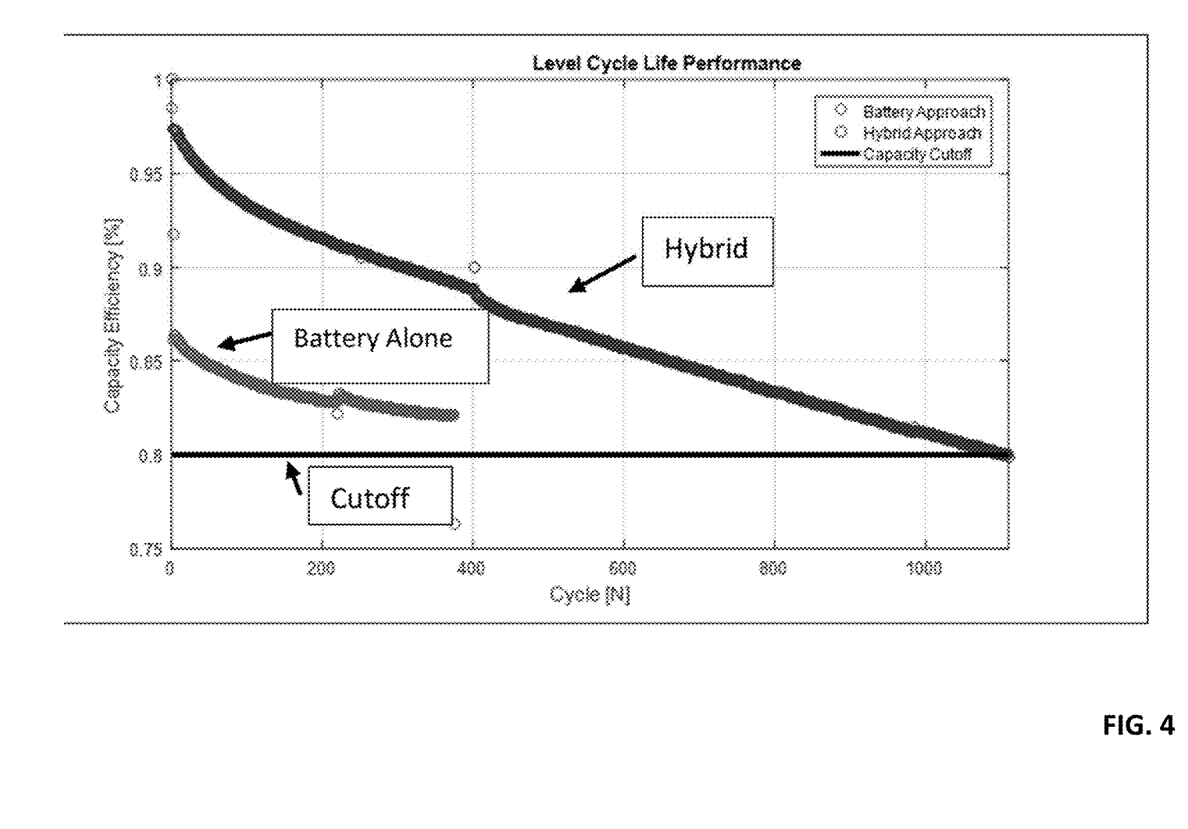
FIG. 4 depicts extended lifetime of battery when used with hybrid under pulsed load conditions.

FIG. 4 shows how many charge/discharge cycles a particular lithium battery can support before it degrades to the point of needing to be replaced. The battery alone has a lifetime of about 380 charge/discharge cycles whereas the hybrid system lasts in excess of 1,200 cycles before the battery needs to be replaced, yielding greater than 3× improvement factor.

Figure 5:
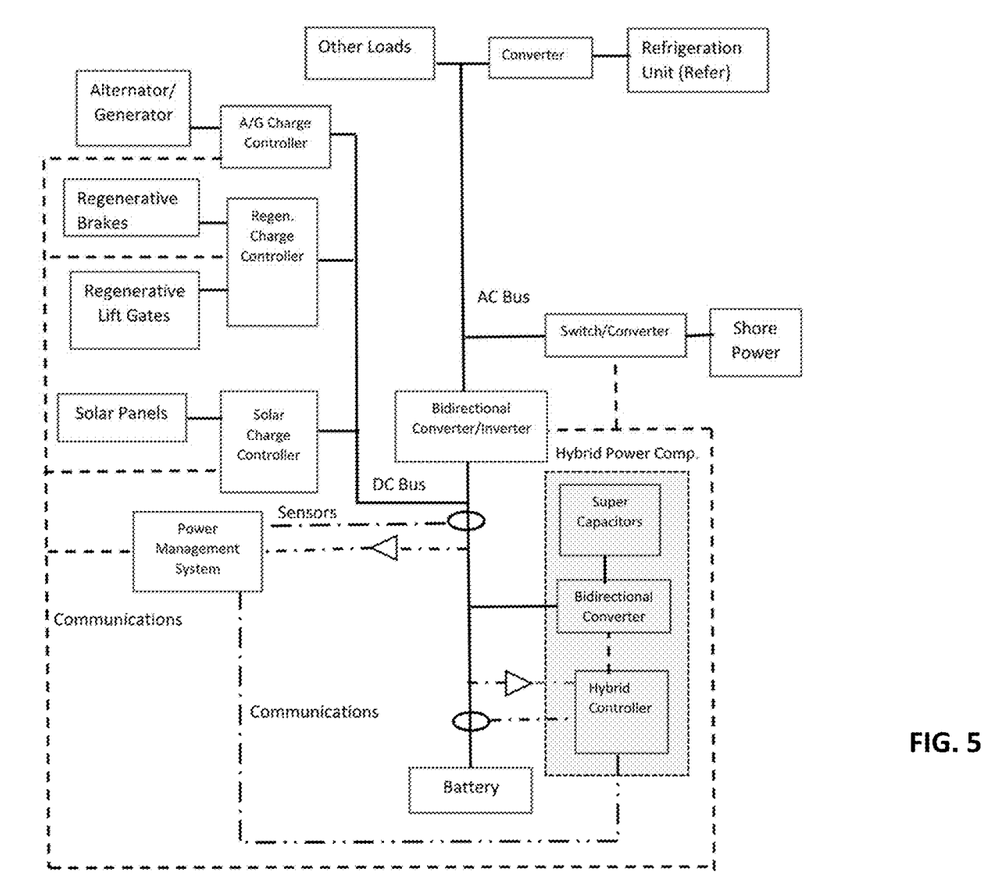
FIG. 5 illustrates a hybrid power management system.

Enhancing the power management system for the refrigerated transport in FIG. 1 with the hybrid power management component in FIG. 2A results in the hybrid power management system shown in FIG. 5. The hybrid power component is connected in parallel with the battery and reduces battery stress in order to realize an extended effective capacity and extended cycle life for the battery in the transport vehicle. This is reflected in longer operation of the refer on a single battery charge and longer battery cycle life before it needs to be replaced. In addition, the super capacitor has much better low temperature performance than a typical battery. Thus, this new system also allows for extended temperature operation using the same battery and this increases the operating environment that can be serviced by the transport vehicle.

The description so far has illustrated the benefits of the hybrid power management system in supplying peak power to the load (ex. On/Off cycling of refrigeration compressor) and absorbing peak power from the battery load (e.g., regenerative braking). In addition to these benefits, the hybrid power management system can be used to apply combinations of positive and negative pulsed or otherwise rapidly changing voltage, current, or power loads to the battery and this can be beneficial during battery charging.

Figure 6:
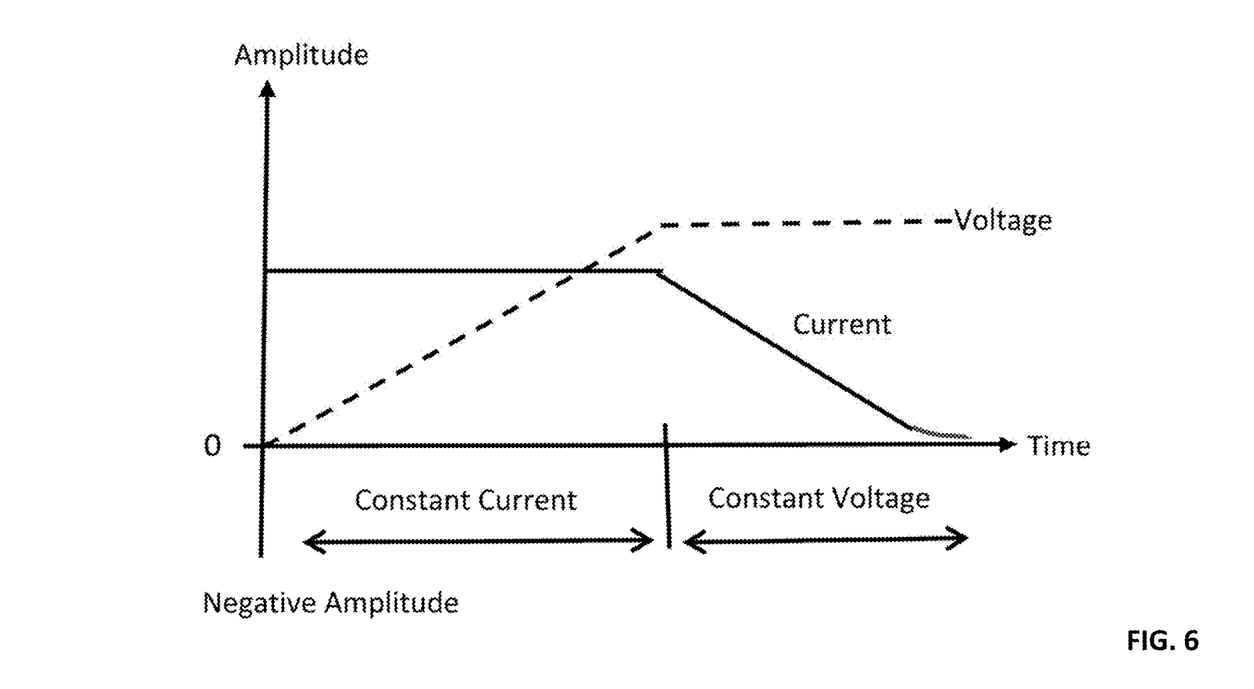
FIG. 6 depicts a typical battery constant current, constant voltage battery charging profile.

FIG. 6 shows a typical current and voltage profile applied to the battery during charging. One of the most common charging profiles is constant current charging until the battery voltage reaches a particular threshold voltage, then a constant voltage is held on the battery, often until the current drops below a specified threshold. The current levels and voltage levels used to charge the battery without major degradation is specified by the battery manufacturer and is a fraction of the battery's discharge current capability. However, in the transport application (and many others), it is very desirable to rapidly recharge the battery while still not degrading the battery's capacity. High current, short duration pulsed charging profiles have shown evidence of being effective as a rapid charging methodology. The hybrid power management system has the capability of applying a general pulse profile to rapidly charge the battery.

Figure 7:
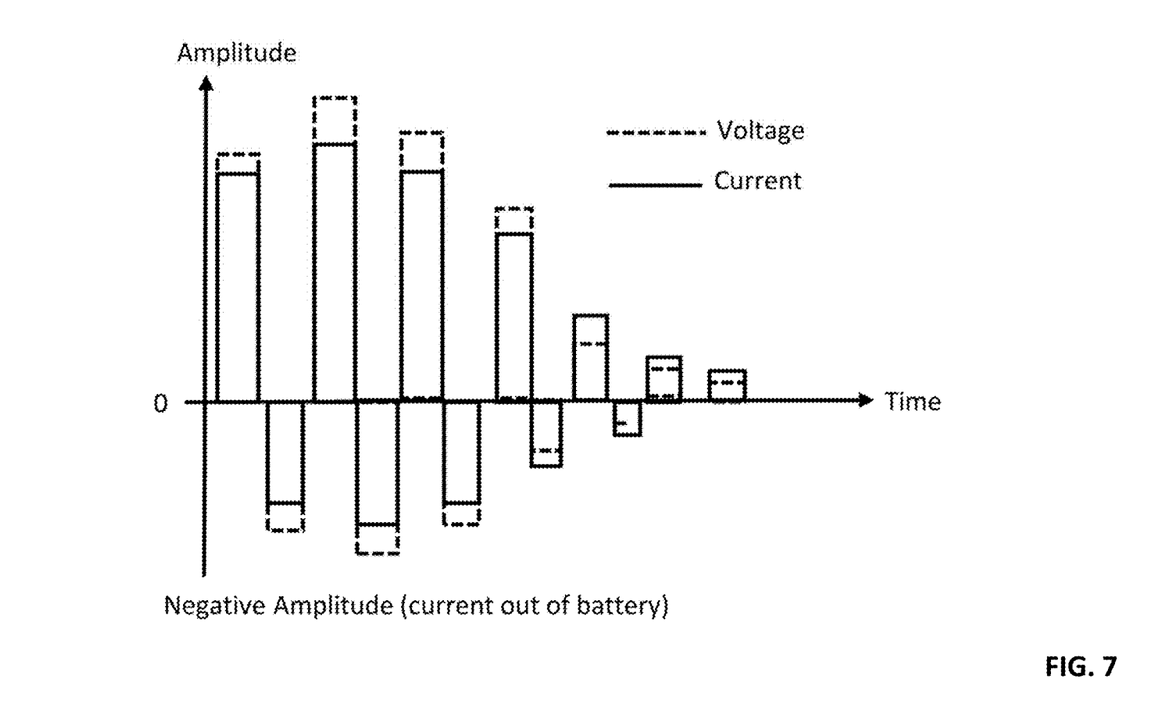
FIG. 7 depicts a general bidirectional pulsed current and pulsed voltage battery charging profile.

A generic pulsed charging profile is shown in FIG. 7 and consists of both positive (into the battery) and negative (out of the battery) current pulses. For dynamic profiles, the super capacitor serves as a temporary power store or sink. Thus, when peak current pulses are needed during charging, the energy can be sourced from the super capacitor. If peak negative current pulses are needed, that energy can be extracted from the battery and moved into the super capacitor. The super capacitor can save that energy and move it back into the battery when needed. This is high efficiency method of applying pulse power profiles to the battery since only minimal energy is dissipated. The desired current profile applied to the battery is generated by moving energy back and forth between the super capacitor and the battery thereby minimizing system power loss that would result from dissipative techniques such as a controlled resistor load.

The ability to move energy in and out of the battery in an efficient manner makes it feasible to add a wireless bidirectional power transfer drone port to the transport vehicle. The energy sourced to the drone (recharge drone) or delivered by the drone to the vehicle battery (recharge vehicle) can be metered and sold as used. The wireless drone port would allow the refrigeration transport vehicle to also act as a mobile drone recharging station that also harvests solar or other types of renewable energy. Power can be transferred to/from the drone by the drone landing on the wireless power pad or flying over it. The wireless charging pad can service one or more drones simultaneously. Flyover power transfer would look like a swarm of drones making passes over the recharging pad to accumulate energy. Since the refer unit is typically carrying perishables to be delivered, it can be envisioned that the truck itself could carry and deploy its own direct delivery drones. This can be especially important in remote deliver locations or in locations in which the necessary electrical infrastructure does not exist or is not functional.

Figure 8:
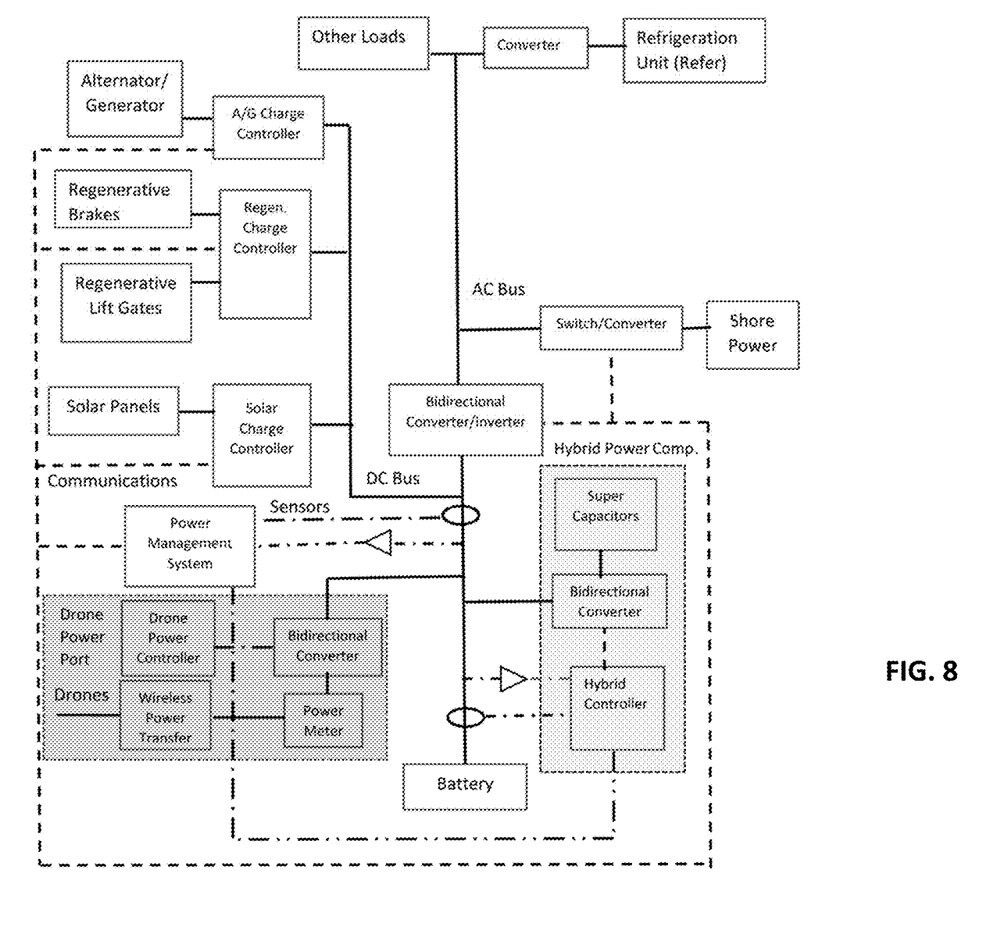
FIG. 8 illustrates a hybrid power management system with drone power port.
Figure 9:
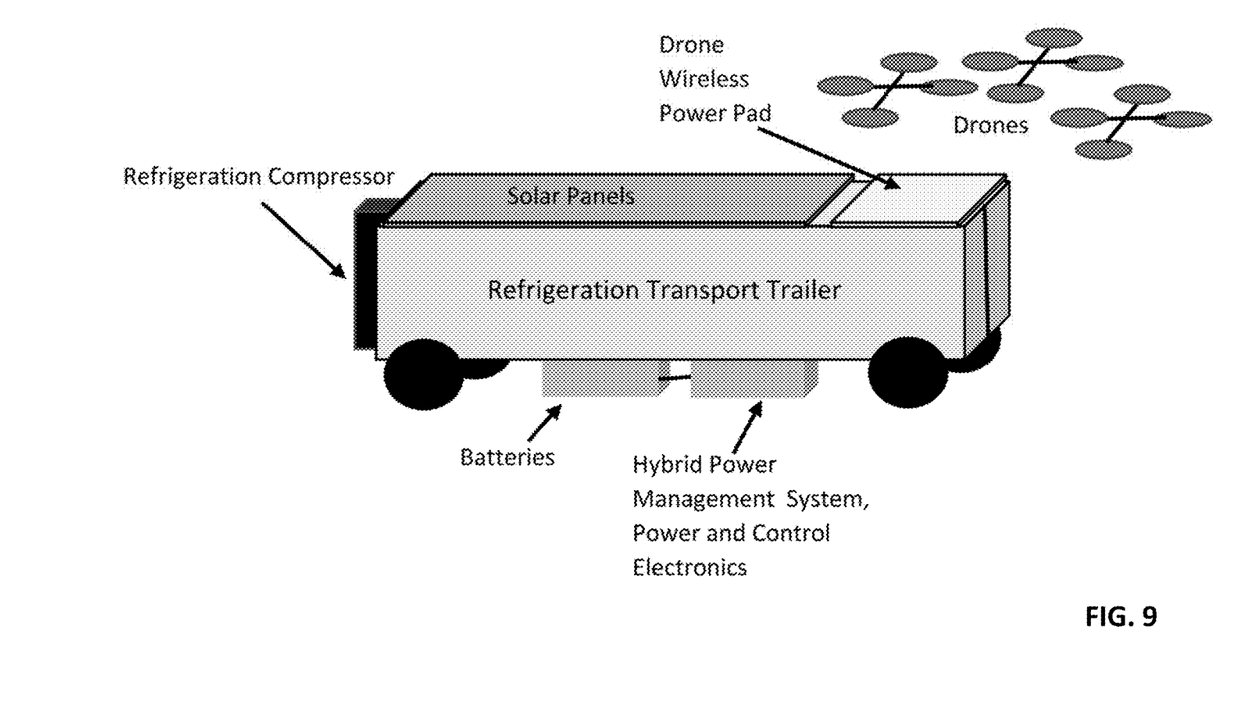
FIG. 9 shows a refrigeration trailer with hybrid power management system and drone power pad.

FIG. 8 shows a block diagram of the hybrid power management system with the integrated drone recharging port. FIG. 9 shows a representation of the physical arrangement of the trailer. In a preferred embodiment, the refrigeration trailer has solar panels mounted to its exterior roof. One portion of the roof is outfitted with a wireless power transfer pad for drones. The wireless power pad contains an array of coils so that a drone can land on the pad or make repeated (as required) passes over the pad to transfer power. The vehicle can be stationary or in-motion during energy transfer. The drone can be stationary or in-motion during the energy transfer. The vehicle battery, power converters, and electronics are encased and mounted below and exterior to the refrigerated compartment in order to maximize the trailer's payload capacity, often consisting of palletized perishable cargo.

FIG. 8 shows that the DC Bus from the battery that is supplemented by the the Hybrid Power Component ultimately allows for the transfer of power between the battery and the drones. Notice that there is also a bidirectional AC/DC converter that allows for bidirectional power flow between the DC bus connected to the battery and the AC bus connected to the shore power. Thus, the shore power is used to charge the battery as needed but the battery can also be used to supply power to the shore. This can be useful in emergency situations where the shore power source is unavailable or undersupplied and the vehicle can then be used as a mobile supplement to the AC grid or microgrid shore power while still minimizing stress on the battery and maximizing battery endurance due to the hybrid power component used in the system.

FIG. 9 shows a preferred embodiment of the present system. The refrigerated trailer is cooled by a compressor unit attached to the exterior front. The compressor unit is powered from the batteries located under the trailer. Power is converted and controlled from a set of power electronics, hybrid power management system, sensors, and other electronics also contained in an environmentally ruggedized box under the trailer. Other electronics and components could be in the system and require additional mounting cases. Not shown but without loss of generality is the shore power connector for recharging the batteries from grid power when the trailer is parked. The solar panels are located on the roof of the trailer and wired to a solar battery charger before being connected to the battery. Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As noted above, particular embodiments of the subject matter have been described, but other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

CONCLUSION

A system and method have been shown in the above embodiments for the effective implementation of a hybrid power management system and method for delivering power in a transport vehicle. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program, computing environment, or specific computing hardware.

What is claimed is:

1. A transport vehicle power system configured to deliver power to a load in a transport vehicle, the transport vehicle power system comprising:
   (a) a battery;
   (b) a super capacitor bank comprising a plurality of capacitors;
   (c) a bidirectional DC/DC converter: (i) the bidirectional DC/DC converter, in order to regulate a pulsed power applied to the battery, configured to either: (1) transfer power to the super capacitor bank in order to absorb power from the load; or (2) transfer power from the super capacitor bank in order to supply power to the load; and (ii) the bidirectional DC/DC converter configured to transfer power between the super capacitor bank and the battery and/or the load in order to charge the super capacitor bank from the battery or the load, or charge the battery/load from the super capacitor bank in a controlled manner using a hybrid controller in order to minimize battery stress and battery degradation;
   (d) the hybrid controller: (i) the hybrid controller, in order to minimize power transients on the battery, configured to identify: (1) when pulsed power is required to the load and instructing the bidirectional DC/DC converter to supply power to the load from the super capacitor bank, or (2) when pulsed power is required from the load and instructing the bidirectional DC/DC converter to absorb power from the load to the super capacitor bank; and (ii) the hybrid controller, in order to minimize battery stress and battery degradation, configured to identify when power needs to be transferred between the super capacitor bank and the battery/load to charge or discharge the battery/load and/or the super capacitor bank, and
   (e) computer storage storing at least one charging pulse profile for efficiently charging the battery;
   wherein the hybrid controller, based on the at least one charging pulse profile, supplying a plurality of positive current pulses, negative current pulses, and combinations thereof, to the battery, where the positive pulses draw current into the battery and the negative pulses draw current away from the battery and, wherein energy drawn out of the battery during application of negative pulses is captured by the hybrid controller rather than dissipated and is circulated back to the battery when needed during application of positive pulses.

2. The transport vehicle power system of claim 1, wherein the positive and negative current pulses comprise a set of alternating positive and negative current pulses.

3. The transport vehicle power system of claim 2, wherein within each set of alternating positive and negative pulses, a magnitude of current in a positive pulse is higher than current in a negative pulse.

4. The transport vehicle power system of claim 1, wherein the hybrid controller is also configured to identify when the load no longer requires/generates a high-power pulse and in response to such identification, the hybrid controller instructing the DC/DC converter to charge/discharge the super capacitor bank using the battery.

5. The transport vehicle power system of claim 1, wherein the hybrid controller identifying when regenerative braking is performed in the transport vehicle, and utilizing power generated based on such regenerative braking to charge the battery, wherein (a) when regenerative energy is pulsed, it is absorbed by the super capacitor bank which starts to charge up the super capacitor bank, and (b) when regenerative pulses stop or are small enough not to stress the battery, the hybrid controller moves energy from the super capacitor bank to the battery.

6. The transport vehicle power system of claim 1, wherein the transport vehicle power system further comprises an external power transfer port, the hybrid controller instructing the DC/DC converter to supply or absorb high power pulse to or from the external power transfer port, thereby moving power to the external device or accepting power from the external device.

7. The transport vehicle power system of claim 5, wherein the external power transfer port supplied with/from high power pulse is configured to wirelessly charge/discharge an external device via wireless power transfer.

8. The transport vehicle power system of claim 1, wherein the transport vehicle power system further comprises at least one renewable charging source to charge the battery and/or the super capacitor bank.

9. The transport vehicle power system of claim 8, wherein the at least one renewable charging source is picked from any of, or a combination of the following: wind, solar, regenerative braking, vehicle alternator, or a generator.

10. The transport vehicle power system of claim 1, wherein a number of capacitors in the plurality of capacitors is picked according to a profile of the load.

11. The transport vehicle power system of claim 1, wherein the transport vehicle power system further comprises a connector to: (a) connect to a grid to charge the battery and/or the super capacitor bank, or (b) connect to transfer power back to a grid.

12. A transport vehicle power system configured to deliver power to a load in a transport vehicle, the transport vehicle power system comprising:
(a) a battery;
(b) a super capacitor bank comprising a plurality of capacitors;
(c) a bidirectional DC/DC converter: (i) the bidirectional DC/DC converter, in order to regulate a pulsed power applied to the battery, configured to either: (1) transfer power to the super capacitor bank in order to absorb power from the load; or (2) transfer power from the super capacitor bank in order to supply power to the load; and (ii) the bidirectional DC/DC converter configured to transfer power between the super capacitor bank and the battery and/or the load in order to charge the super capacitor bank from the battery or the load, or charge the battery/load from the super capacitor bank in a controlled manner using a hybrid controller in order to minimize battery stress and battery degradation;
(d) the hybrid controller: (i) the hybrid controller, in order to minimize power transients on the battery, configured to identify: (1) when pulsed power is required to the load and instructing the bidirectional DC/DC converter to supply power to the load from the super capacitor bank, or (2) when pulsed power is required from the load and instructing the bidirectional DC/DC converter to absorb power from the load to the super capacitor bank; and (ii) the hybrid controller, in order to minimize battery stress and battery degradation, configured to identify when power needs to be transferred between the super capacitor bank and the battery/load to charge or discharge the battery/load and/or the super capacitor bank;
(e) an external bidirectional power transfer port, the hybrid controller instructing the bidirectional DC/DC converter to supply/absorb high power pulses to/from the external bidirectional power transfer port, the external bidirectional power transfer port configured to wirelessly charge/discharge an external device via wireless power transfer; and
(f) computer storage storing at least one charging pulse profile for efficiently charging the battery;
wherein the hybrid controller, based on the at least one charging pulse profile, supplying a plurality of positive current pulses, negative current pulses, and combinations thereof, to the battery, where the positive pulses draw current into the battery and the negative pulses draw current away from the battery and, wherein energy drawn out of the battery during application of negative pulses is captured by the hybrid controller rather than dissipated and is circulated back to the battery when needed during application of positive pulses.

13. The transport vehicle power system of claim 12, wherein the positive and negative current pulses comprise a set of alternating positive and negative current pulses.

14. The transport vehicle power system of claim 13, wherein within each set of alternating positive and negative pulses, a magnitude of current in a positive pulse is higher than current in a negative pulse.

15. The transport vehicle power system of claim 12, wherein the hybrid controller is also configured to identify when the load no longer requires/generates a high-power pulse and in response to such identification, the hybrid controller instructing the DC/DC converter to charge/discharge the super capacitor bank using the battery.

16. The transport vehicle power system of claim 12, wherein the hybrid controller identifying when regenerative braking is performed in the transport vehicle, and utilizing power generated based on such regenerative braking to charge the battery, wherein (a) when regenerative energy is pulsed, it is absorbed by the super capacitor bank which starts to charge up the super capacitor bank, and (b) when regenerative pulses stop or are small enough not to stress the battery, the hybrid controller moves energy from the super capacitor bank to the battery.

17. The transport vehicle power system of claim 12, wherein the refrigerator vehicle power system further comprises at least one renewable charging source to charge the battery and/or the super capacitor bank.

18. The transport vehicle power system of claim 17, wherein the at least one renewable charging source is picked from any of, or a combination of the following: wind, solar, regenerative braking, vehicle alternator, or a generator.

19. The transport vehicle power system of claim 12, wherein a number of capacitors in the plurality of capacitors is picked according to a profile of the load.

20. The transport vehicle power system of claim 12, wherein the transport vehicle power system further comprises a connector to: (a) connect to a grid to charge the battery and/or the super capacitor bank, or (b) connect to transfer power back to a grid.

* * * * *